Inventor
MYRON F. HILL

Patented Nov. 27, 1945

2,389,728

UNITED STATES PATENT OFFICE 2,389,728

ELLIPTICAL CONTOUR FOR ROTOR TEETH

Myron F. Hill, Westport, Conn.

Application October 14, 1943, Serial No. 506,256

12 Claims. (Cl. 74—462)

My invention in part is divided out of my prior patents, Nos. 1,682,563, 1,833,993 and 2,031,888 disclosing it broadly, but not claiming it specifically.

In the first of said patents, specific claims were drawn for rotors in which a pinion tooth crown was circular and the other curves determined by the circular crown.

In the second patent specific claims were drawn to tooth contours of epi and hypocycloids.

In the third patent above mentioned specific claims applied to contours developed by a master circle having the size and location of a tooth of the outer rotor.

In this case claims are drawn to contours developed by master forms of oval types, including particularly an elliptical curve. Also to contours developed by the master oval with a middle axis lying at an angle to a radius of the pitch circle.

The driving relation in these successive forms is improved, other conditions, such as size, eccentricity and numbers of teeth, remaining the same.

In the first patent the driving range does not cross the point of tangency between the ratio circles at full mesh.

In the second patent in the driving range, the instant radii of curvature of the tooth curves diminish to zero at the full mesh or pitch point, and their rapid wear quickly destroys efficiency. As the instant centers of curvature are upon the pitch circle no circroidal addition is involved.

In the third patent the driving range extends well across full mesh but the pressure angles are capable of improvement.

According to the present invention the curves are altered with the object of improving the driving relations between the rotors.

In the first and third patents the circroidal addition (referred to as the curtate addition in the patents) is of paramount importance. It is the distance outside of the ratio or pitch circle at which a center, or centers, of curvature of a master generating form must lie in order to design contours that have tight contacts during continuous rotary motion, and that are capable of speeds and loads without vibration and noise.

In this application, taking an ellipse as an example, its form being in accordance with well known factors, it is apparent that as compared to a circle of similar size, some portions have a greater radius of curvature as compared to the circle and others a lesser radius. If used as a master form representing a tooth contour of the outer rotor, with a middle axis through the foci, arranged normal to the radius of its ratio circle, the ends have sharper curves than the middle or side portions and are adjustable to an angle that provides better angles of driving pressure. If the axis of the ellipse coincides with the radius of the ratio circle, the curves of the middle portions have better angles of driving pressure than the corresponding circle. And when a drive in one direction is of greater importance, particularly if there is no drive in the opposite direction, the axis may lie at an angle to the radius, providing even better driving relations.

These various forms are illustrated in the drawings, it being understood that variations of these oval curves are possible so long as the circroidal addition is varied to suit them when necessary or desirable.

Figure 1:
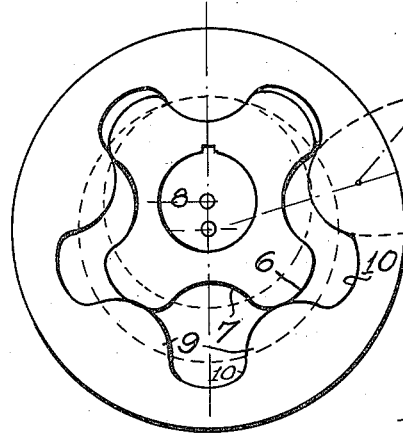
Fig. 1 is a side view showing curves employing an ellipse as a master form, its long axis on a radius of the outer ratio circle.

In Fig. 1 is shown an elliptical master form 5, and convex and concave contours 6, 7, generated therefrom, on the pinion 8. The outer rotor teeth 9 all conform to the end of the ellipse 5, and the spaces 10 are generated by the rotor teeth 6.

Figure 2:
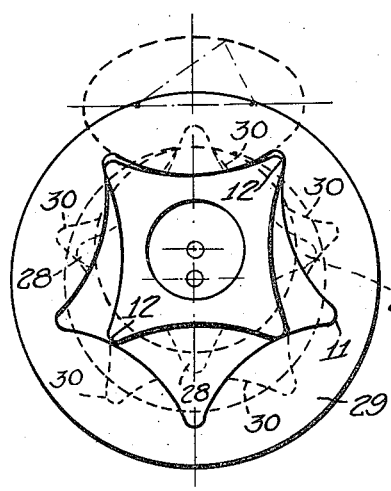
Fig. 2 is a similar view showing a modification with the ellipse axis normal to the same radius; also how a difference of two teeth may be attained.

When the pinion teeth are quite narrow as in Fig. 2 the ellipse being at right angles to that in Fig. 1, the space curves 11 may be generated or merely be outside of the true curve generated by the pinion teeth 12, enough to clear the tops of the pinion teeth during rotation.

In Fig. 1 the drive alternates between the convex and the concave contours of the teeth of both rotors.

Figure 3:
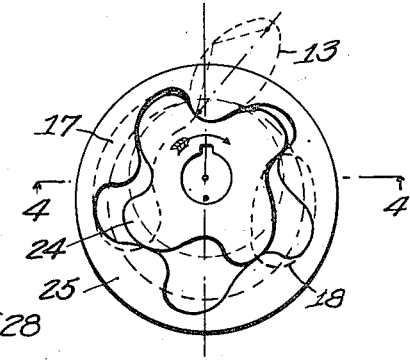
Fig. 3 shows another modification with the ellipse at an angle to the same radius.

In Figs. 2 and 3 it is approximately between the convex curves of the outer rotor and concave spaces of the inner rotor. With more teeth this relation is even more efficient.

In Fig. 3, the angular location of the ellipse 13 changes the pressure angle, favoring a pinion drive clockwise yet capable of occasional reversal of drive, as in an auto when used as a lubricating pump for the engine.

Figure 4:
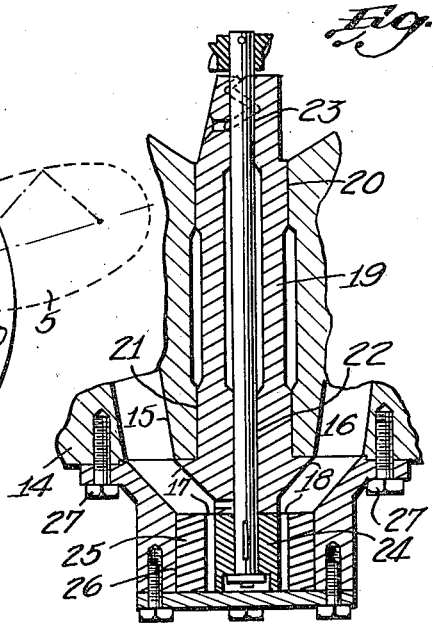
Fig. 4 is a sectional view showing a liquid pump for an auto engine utilizing the rotors illustrated (somewhat enlarged) and taken on line 4—4 of Fig. 3.

Such a pump is illustrated in Fig. 4, the engine casing 14 providing passageways 15, 16 for the flow of oil to and from the rotors, through ports 17, 18 indicated by broken lines in Fig. 3.

The pump casing is bolted at 27 to the engine casing and comprises a shank 19 fitting the engine casing at 20, 21, and extending to the region of the engine cam shaft for a driving connection. The pump casing provides journals at 22 and 23 for the pump shaft to the lower end of which is secured the pinion 24 meshing with the outer rotor 25 which is journalled at 26 in the pump casing. This journal is eccentric to the axis of the shaft. The pump according to this invention cuts down the cost of manufacture of such pumps, substituting one shaft for the usual two shafts of gear pumps, one journal recess in place of two for the gear pumps, one gear fit to a shaft in place of two, and works more silently and with greater durability.

The shank 19 of the pump casing extends into the engine casing to gear the pump shaft to an engine cam shaft for driving purposes. The oil pressure leaks thru the bearings at 22, 23 to keep them well lubricated.

The systems of generation useful in the invention are set forth clearly in the aforesaid patents.

While I have shown and particularly described "four by five" internal rotors having a difference of one tooth, the invention is not limited to them. Such internal gears are about the most difficult to design of all types of gears having spur teeth. Internal gears having a difference of more than one tooth, with no engagement at open mesh, but engaging where the chambers between the teeth open or close, follow the same system of generation. External gears; spur, spiral bevel, hypoid, elliptical, and worm gears; all may employ the tooth contours of this invention with an increase in durability and silent operation.

In Fig. 2 it is evident that the pinion teeth may be doubled in number by putting an extra tooth 28 in each pinion tooth space; and that the number of teeth in the outer rotor 29 may be doubled by inserting a tooth space 30 into each outer rotor tooth; all the teeth having the oval characteristics. These sets of teeth have no "hunting" relation to each other; and the curves of one set on both rotors may differ from those of the other set on both rotors.

Figure 5:
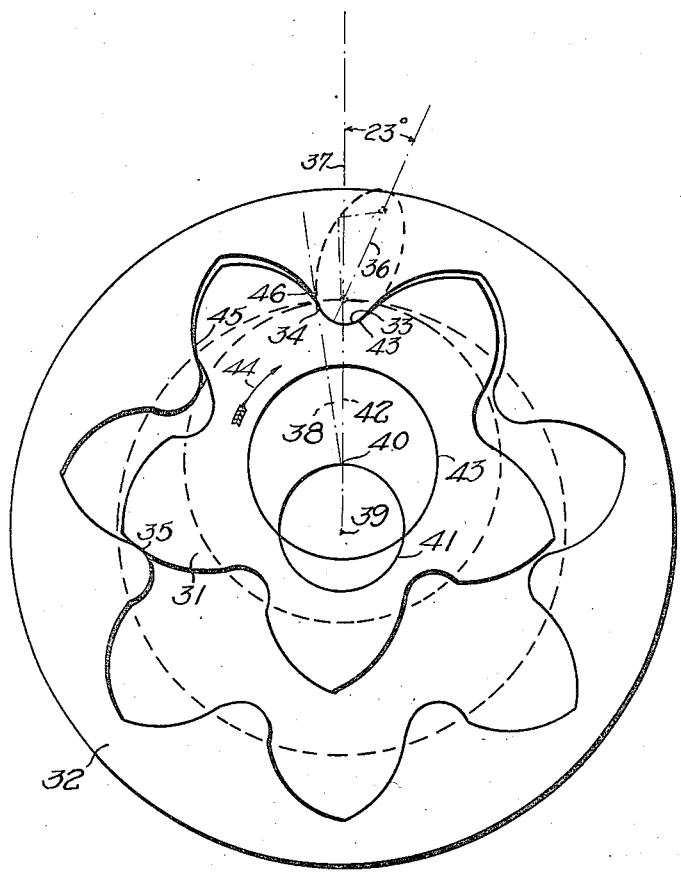
Fig. 5 shows the oval tooth form applied to rotors having five and seven teeth.

Fig. 5 illustrates a modification involving uneven numbers of teeth with tooth contours generative of portions of an ellipse.

The numbers of teeth as heretofore described, may have many variations. In this figure the pinion 31 has five teeth and the outer rotor 32 has seven so that each tooth of one rotor makes continuous contact at different times with each tooth of the other rotor—i. e., the "hunting" relation. Any oval curve may be used. An ellipse may be indicated, one end 33 of which is the master form. Or the form 33 may be something near an ellipse with circular arcs of different radii or mongrel curves which generate their own mating curvatures. An ellipse is well defined in geometry. The term "oval" is sometimes defined as an ellipse because an ellipse has an oval form. My invention relates only to ellipses and to those irregular ovals which are neither circular nor cycloidal.

The specific form of rotors shown in my Patent No. 1,682,563 comprised convex contours on the outer teeth which have been described as ovals of varying radii, while the crowns of the pinion teeth are circular. The reverse is true in my Reissue Patent No. 21,316. This present case therefore is limited to teeth of both rotors being irregular ovals or ellipses as above defined.

These irregular ovals also distinguish from cycloids which, while oval in type, have radii regularly reducing to zero at the pitch circle.

The object of elliptical-oval tooth contours is to concentrate driving relations in regions as at 34 where curves may be designed to give the best anti-friction results, though constant pressure contact relations elsewhere as at 35 may have curves not suitable for driving.

In fact in the form shown, the end 33 of an ellipse appears to pause during rotation, while it turns in the pinion tooth space in the midst of the driving action as one rotor causes the other to rotate. With five and seven teeth this function lasts for more than half of a tooth division. With more teeth it may last a whole tooth division.

For lower pressures these five to seven tooth rotors are serviceable. As pressures increase, the numbers of teeth should increase. Particularly is this true in order to increase the numbers of chambers having stages of gas pressures to reduce the slip from a chamber having a higher pressure to the next chamber having a lower pressure.

The angle of the main axis of the ellipse to a radius through it may vary with the numbers of teeth. But any angle may be employed for any use. The angles between the axis 36 of the ellipse shown in this figure is supposed to be 23° from the radius 37 of the ratio circle.

The radius 38 lies about tangential to the driving contact contours above 34, which would provide a pressure angle of about zero degrees.

The axis of the outer rotor is at 39. If the outer rotor is held stationary, the pinion may be rotated on its axis 40 while that axis travels around the circle 41, whose radius is equal to the eccentric distance from 39 to 40, the teeth of the rotors making continuous travelling contacts on the driving side of the center line 42 through the axes. If the pinion is driven by its shaft 43 in the direction of the arrow 44 the teeth will make sliding fluid tight contacts at 35 and 45, which after running themselves in are substantially pressureless, and a rolling fluid tight driving contact at 46 for driving the outer rotor.

The master oval form determines all the gear curves that mutually engage each other. By employing gears of ordinary type, mounting a master form on one gear, and a blank card board or metal on the other gear, locating both gears on axes and with teeth in correct mesh so that their ratio circles are tangent to each other, generated gear curves may be outlined on the blank by tracing the master form in successive positions where it lies, in whole or in part, over the blank. A curve touching the crests of the traced curves is then the approximate gear curve having a generative relation to the master form.

If the master form undercuts the gear driving portions of the tooth curve so outlined, it either is not suitable itself, or it is not located far enough from the center of the blank when in the critical position at full mesh nearest to the center of the blanks.

Oval curves that lie too closely along radii of the blank, or that have proper curves but too near the center of the blank in the critical position will often cut away the tooth curves needed for driving. By shifting the master form further away from the center of the blank or by turning its curve to a different angle, or both, if sufficient, undercutting of driving curves, either convex or concave, will be avoided, and driving curves will be arrived at capable of maintaining continuous driving engagement at uniform speeds.

The numbers of teeth may be varied to suit of course. The greater the number of teeth the more perfect the drive between convex curves on the teeth of one gear and concave curves on the teeth of the other gear.

The invention is by no means limited to the form illustrated in Fig. 3, but I have found that the dimensions of that may be arrived at by using an ellipse with foci $7\frac{1}{16}$ apart; the sum of the two distances from a point on the ellipse to the two foci $8\frac{1}{2}$. The angle of the axis of the ellipse taken through the foci, to the radius of the outer ratio circle, being about 45°, the outside diameter of the pinion being $12\frac{1}{2}$ and the eccentricity of the ratio circles $1\frac{1}{16}$. These figures may be inches, centimeters, or any other unit needed to give the size desired.

In case gears drive in one direction only, one portion of the curve of the master form may follow the invention to generate one side of a tooth, while when no contacts with it are needed another portion may undercut the other side of that tooth.

While my invention applies to a wide field of gear teeth, and is suitable for teeth of rotary fluid mechanisms, it is obvious that it may be adapted to a wide variety of mechanisms. While ratio circles have formed the basis of description, other ratio curves or lines are sometimes used, and are intended to be included in the scope of this invention.

What I claim is:

1. A rotary mechanical movement comprising two toothed rotor members having internal and external teeth respectively, one member within and eccentric to the other, and having driving contours characterized by curves described or outlined one by the teeth of the other at relatively steady or uniform angular speeds, said contours having instant centers of curvature at a distance outside of the pitch or ratio circles to provide continuous travelling contacts or engagements between the teeth during opening and closing, said driving contours of the teeth of both rotors including oval curves as distinguished from circles and cycloids.

2. The combination claimed in claim 1, said rotors having a difference of one tooth division.

3. The combination claimed in claim 1 including driving curves engaging each other at the full mesh point.

4. In combination mating gears or rotors having a driving range, one having for a master generating tooth form an oval curve as distinguished from a circle or cycloid, the other gear having a mated generated form of tooth curvature, the ratio circle of the master gear lying outside of and tangent to the ratio circle of the mated gear, having as the actual gear or rotor curves regular and repeated variations of curvature for each tooth division outlined continuously at relatively uniform angular speed by said master form, the middle point of said master form being located outside of the ratio circle of the mated gear when at the point of tangency of the ratio circles, at a sufficient distance therefrom; whereby the teeth of the mating gear have oval curves as distinguished from circles and cycloids.

5. The combination claimed in claim 1, having said engagements occurring inside and outside of said ratio circle.

6. In a pair of gears, a tooth curve of a first gear generated or outlined by a curved master form representing the tooth form of the second gear, with a point representing the instant center of a portion of the contour of said master form following an epitrochoid on the ratio circle of the first gear, which epitrochoid is traced by said point while it is carried around said ratio circle of said first gear by the ratio circle of the second gear rolling upon the ratio circle of the first gear, said master form located sufficiently outside of the ratio circle of the first gear to prevent undercutting the driving portions of the teeth of the first gear, the driving portions of both gears having oval curves as distinguished from circles and cycloids and maintaining in the driving range continuous contact at uniform angular speeds.

7. The combination claimed in claim 1, having the master form tooth curve conforming to a relatively long radius of curvature whereby said mated tooth convex curve is relatively narrow angularly.

8. In a gear pair, master convex driving tooth faces having continuous unreversed curves on one gear lying across the ratio circle of that gear, partly within and partly outside said circle, engaging continuous unreversed driving tooth surfaces of the other conforming to concave curves outlined by said master convex driving faces at constant relative speed determined by the tooth ratio of said gears, said master curves disposed at such distances outside of the ratio circle of the gear having convex driving curves to prevent outlining concave curves having "undercuts" or driving areas out of contact with said master faces, in the full mesh region; said driving surfaces having oval curves as distinguished from cycloids and circles.

9. Two meshing gears having engaging faces and flanks of forms determined by the system of generation at uniform angular speeds determined by the ratio of the teeth, wherein the ratio circle of the first gear is located outside of the ratio circle of the second gear, and wherein a master form having an oval contour as distinguished from a circle or cycloid, is selected for a face of said first gear and located with relation to the second gear so that a center of curvature of the master form lies outside of the ratio circle of that gear, at a sufficient distance to outline, during generation, a continuous mating curve on said second gear.

10. A pair of meshing gears having teeth, one side of the teeth of one gear having driving curves continuously concave extending substantially outside of its ratio circle and near to the outermost portion of the tooth curve, the mating sides of the teeth of the other gear having curves maintaining continuous contact at uniform speeds, said curves having oval forms as distinguished from circles and cycloids.

11. In a gear tooth form, a tooth surface conforming to an epicroid curve, and comprising an envelope of an oval master form as it travels along an epicircroid around the ratio circle of said gear, said circroid being disposed outside of the ratio circle of said gear far enough to prevent undercutting of the driving portions of said gear tooth, said master form being an oval as distinguished from a circle and having a minimum radius of curvature greater than zero.

12. In a pair of gears, a tooth curve on a first gear having a driving area such as is generated or outlined by the outside of an ellipse, acting as a master form, said master form representing the form, size and relative location of the driving area of a tooth of a second gear, a point representing the instant center of a portion of the contour of said master form following an epicircroid traced by a point carried around the ratio circle of said first gear by the ratio circle of said second gear as one rolls upon the other without slip, said point being located sufficiently outside the ratio circle of the second gear to prevent undercutting during generaion of said driving areas on said first gear.

MYRON F. HILL.